(12) United States Patent
Khaira et al.

(10) Patent No.: US 11,839,810 B2
(45) Date of Patent: *Dec. 12, 2023

(54) GAME CONTROLLER FOR A MOBILE DEVICE

(71) Applicant: Backbone Labs, Inc., Vancouver, WA (US)

(72) Inventors: Maneet Singh Khaira, Vancouver, WA (US); Atsushi Shirata, Neyagawa (JP); Francois Pierre René Dransart, San Francisco, CA (US); Gregory Robert Cerny, Palo Alto, CA (US); Wei-Jun Wang, Menlo Park, CA (US); Jon Lake, Sunnyvale, CA (US)

(73) Assignee: BACKBONE LABS, INC., Vancouver, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/850,912

(22) Filed: Jun. 27, 2022

(65) Prior Publication Data

US 2022/0323857 A1 Oct. 13, 2022

Related U.S. Application Data

(63) Continuation of application No. 16/808,339, filed on Mar. 3, 2020, now Pat. No. 11,389,721.

(51) Int. Cl.
*A63F 13/24* (2014.01)
*A63F 13/92* (2014.01)

(52) U.S. Cl.
CPC ............ *A63F 13/24* (2014.09); *A63F 13/92* (2014.09)

(58) Field of Classification Search
CPC .......... A63F 13/24; A63F 13/92; A63F 13/23; A63F 13/98; A63F 13/20
See application file for complete search history.

(56) References Cited

U.S. PATENT DOCUMENTS 10,868,436 B1    12/2020  Chen et al.
11,389,721 B2 *   7/2022  Khaira .................... A63F 13/24
(Continued)

FOREIGN PATENT DOCUMENTS

CN    107008005 A    8/2017
CN    207532765 U    6/2018
(Continued)

OTHER PUBLICATIONS

International Search Report and Written Opinion of the International Searching Authority issued in International Application No. PCT/US2021/019941, dated Jun. 9, 2021 (12 pages).

*Primary Examiner* — Peter J Iannuzzi
(74) *Attorney, Agent, or Firm* — Miller Nash LLP

(57) ABSTRACT

A game controller for a mobile device, the game controller having a first handle, a bridge, a first spring mechanism, and a first latch mechanism. The first handle is configured to contact and support a mobile device and includes a user-accessible, first hardware interface on a main body portion of the first handle. The bridge is in sliding engagement with the first handle. The bridge and the first handle are configured for the main body portion of the first handle to translate in a retraction direction toward a midline of the bridge and into a retracted configuration and also to translate in an extension direction away from the midline of the bridge into an extended configuration. The first spring mechanism is configured to bias the first handle toward the retracted configuration. The first latch mechanism is configured to temporarily lock the bridge in the extended configuration.

24 Claims, 8 Drawing Sheets

(56) References Cited

U.S. PATENT DOCUMENTS

| | | | |
|---|---|---|---|
| 2005/0017953 A1 | 1/2005 | Pekka | |
| 2005/0247550 A1 | 11/2005 | Hamada | |
| 2006/0234794 A1 | 10/2006 | Baseflug et al. | |
| 2011/0014984 A1 | 1/2011 | Penman et al. | |
| 2013/0033829 A1 | 2/2013 | Furubo et al. | |
| 2014/0018173 A1 | 1/2014 | Urhman | |
| 2014/0274394 A1* | 9/2014 | Willis | G06F 1/1656 463/37 |
| 2014/0317329 A1 | 10/2014 | Barnett et al. | |
| 2015/0018101 A1 | 1/2015 | Schoenith et al. | |
| 2015/0273325 A1* | 10/2015 | Falc | G06F 1/1626 463/37 |
| 2015/0281422 A1* | 10/2015 | Kessler | H04M 11/007 455/557 |
| 2016/0132114 A1 | 5/2016 | Rihn | |
| 2016/0317919 A1 | 11/2016 | Gassoway et al. | |
| 2018/0004250 A1 | 1/2018 | Barnett et al. | |
| 2018/0133594 A1* | 5/2018 | Guo | A63F 13/245 |
| 2018/0345136 A1 | 12/2018 | Schmitz et al. | |
| 2018/0369692 A1 | 12/2018 | Winick | |
| 2019/0079584 A1 | 3/2019 | Bonanno et al. | |
| 2019/0358534 A1* | 11/2019 | Fang | A63F 13/92 |
| 2019/0379231 A1* | 12/2019 | Gonzalez | A63F 13/24 |
| 2020/0155928 A1 | 5/2020 | Guo | |
| 2020/0282309 A1* | 9/2020 | Liao | A63F 13/92 |
| 2020/0353351 A1* | 11/2020 | Mao | A63F 13/92 |
| 2020/0353369 A1 | 11/2020 | Esselstrom et al. | |
| 2021/0104907 A1 | 4/2021 | Chen et al. | |
| 2021/0275907 A1 | 9/2021 | Khaira et al. | |
| 2021/0308566 A1* | 10/2021 | Kong | A63F 13/92 |
| 2022/0032179 A1 | 2/2022 | Khaira et al. | |
| 2022/0339533 A1 | 10/2022 | Schoenith et al. | |

FOREIGN PATENT DOCUMENTS

| | | |
|---|---|---|
| CN | 207838250 U | 9/2018 |
| CN | 208115138 U | 11/2018 |
| CN | 208636809 U | 3/2019 |
| CN | 209392718 U | 9/2019 |
| EP | 1380324 A1 | 1/2004 |
| EP | 1380324 B1 | 9/2005 |
| GB | 2608588 A | 1/2023 |
| WO | 2023034596 A1 | 3/2023 |

* cited by examiner

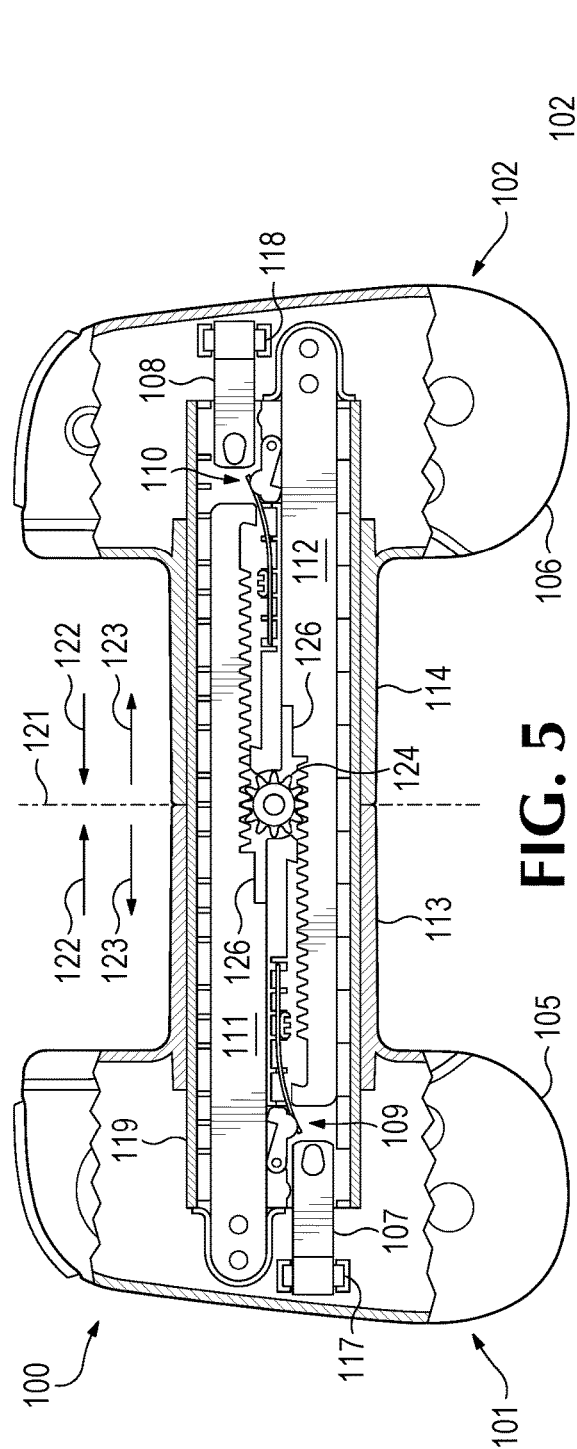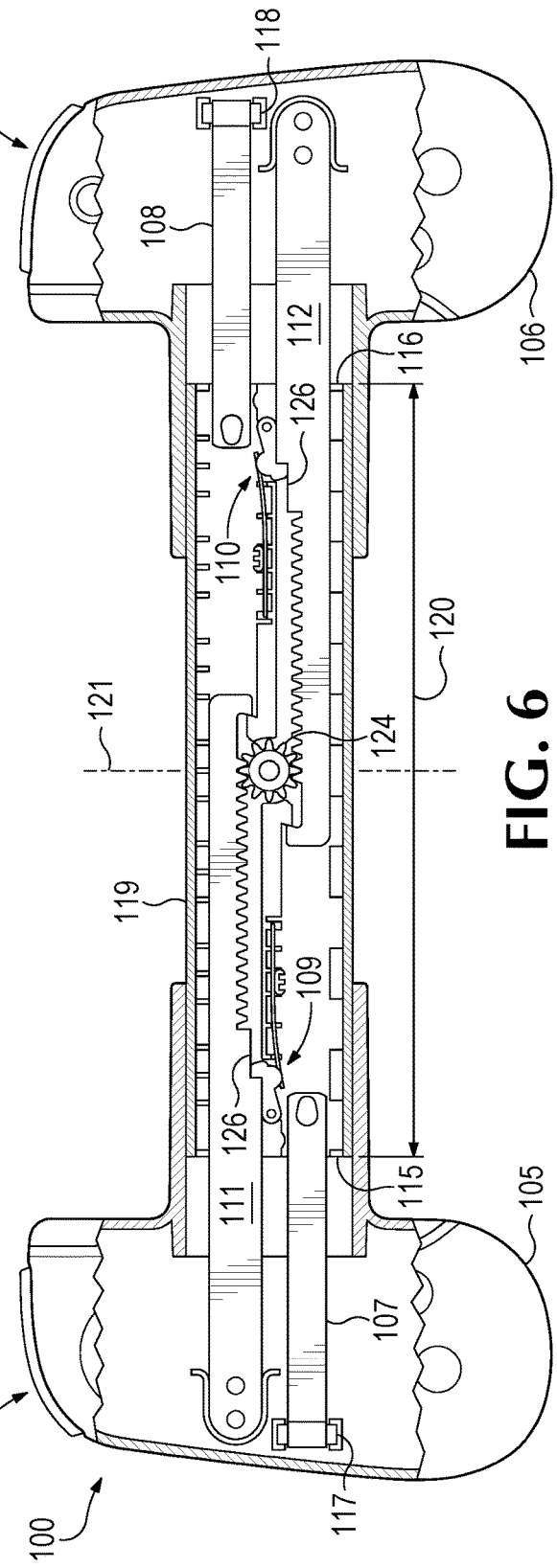

GAME CONTROLLER FOR A MOBILE DEVICE

CROSS-REFERENCE TO RELATED APPLICATIONS

This application is a continuation of U.S. non-provisional patent application Ser. No. 16/808,339, filed Mar. 3, 2020, the disclosure of which is incorporated herein by reference in its entirety.

TECHNICAL FIELD

The subject matter is related to an apparatus and methods for a game controller for a mobile device.

BACKGROUND

A game controller is a device used to provide input to a video game, for example to control an object or character in the video game. The video game may be running on a computer, a specially designed gaming system, or a mobile device. In some prior art devices, the game controller is designed to mechanically couple to a mobile device.

Embodiments of the technology disclosed in this document address shortcomings in the prior art.

BRIEF DESCRIPTION OF THE DRAWINGS

FIG. 5 is a front, partial sectional view of the game controller of FIG. 1 in an example of a retracted configuration of the game controller.

FIG. 6 is a front, partial sectional view of the game controller of FIG. 1 in an example of an extended configuration of the game controller.

DETAILED DESCRIPTION

As described in this document, embodiments are directed to a game controller for a mobile device with a hold-open feature.

Keeping the handles pulled apart while inserting the mobile device into a game controller can be difficult. For example, a user holding a mobile device in the user's right hand may need to use the user's left hand to pull the two handles apart when placing the mobile device between the two handles of the game controller. This difficulty with insertion may be exacerbated when the game controller connects to the mobile device via a connector, such as USB-C connector, because the user must also ensure that the mobile device is aligned with the connector when inserting it. The removal of the mobile device may be equally vexing as the user must once again attempt to pull the two handles apart with one hand.

But in embodiments of the disclosed game controller, once the handles are pulled apart sufficiently, the handles lock in place, allowing the user to easily insert the mobile device. Then, by applying light pressure on the handles, the user can unlock the handles and snap the device shut, securing the mobile device to the game controller.

Figure 1:
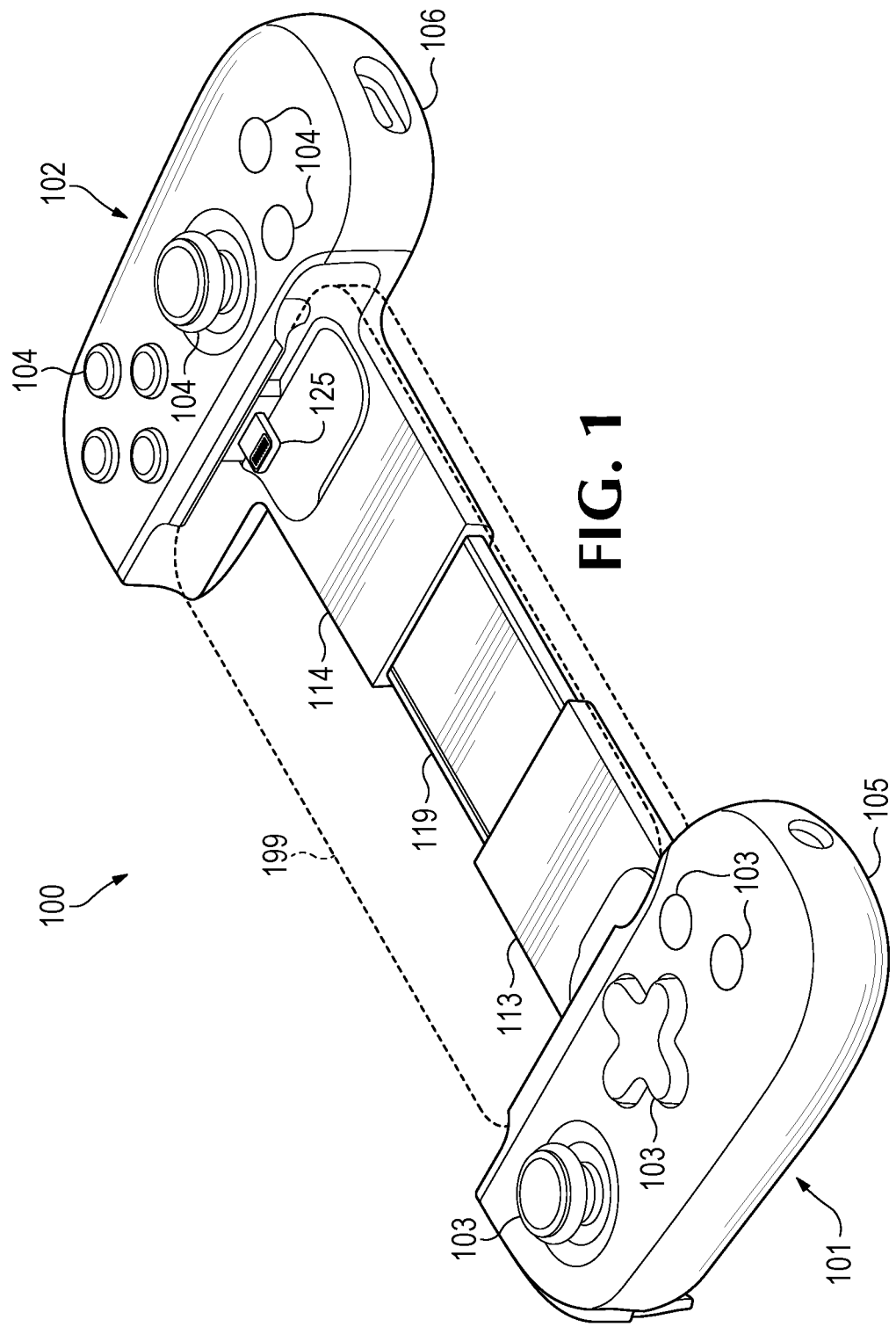
FIG. 1 is a perspective view of a game controller, according to embodiments.

FIG. 1 is a perspective view showing portions of a game controller 100, according to embodiments. As illustrated in FIG. 1, a game controller 100 may include a first handle 101, a second handle 102, and a bridge 119. Each of the first handle 101 and the second handle 102 is configured to contact and support a mobile device 199, though not all contemplated embodiments will include the second handle 102. An exemplary mobile device 199 is shown in broken lines to illustrate how the game controller 100 may contact and support a mobile device 199 in some embodiments. The mobile device 199 may be, as examples, a smartphone or a tablet computer.

As illustrated in FIG. 1, the first handle 101 includes a guide portion 113 and a main body portion 105. The guide portion 113 extends from the main body portion 105 and along a first end 115 of the span 120 of the bridge 119. (See also FIGS. 5 and 6.) The guide portion 113 of the first handle 101 is configured to align the bridge 119 with the main body portion 105 of the first handle 101.

As illustrated, the first handle 101 includes a user-accessible, first hardware interface 103 on the main body portion 105 of the first handle 101. The first hardware interface 103 could be a button, an analog stick, a touchscreen, a touchpad, a knob, a slider, a switch, a wheel, a dial, a directional pad, or another such feature configured to accept touch inputs from a user's finger or a stylus. As shown in FIG. 1, the first hardware interface 103 may include multiple such hardware interfaces.

Likewise, the second handle 102 includes a guide portion 114 and a main body portion 106. The guide portion 114 extends from the main body portion 106 and along a second end 116 of the span 120 of the bridge 119. (See also FIGS. 5 and 6.) The guide portion 114 of the second handle 102 is configured to align the bridge 119 with the main body portion 106 of the second handle 102.

As illustrated, the second handle 102 further includes a user-accessible, second hardware interface 104 on the main body portion 106 of the second handle 102. As above for the first hardware interface 103 of the first handle 101, the second hardware interface 104 could be a button, an analog stick, a touchscreen, a touchpad, a knob, a slider, a switch, a wheel, a dial, a directional pad, or another such feature configured to accept touch inputs from a user's finger or a stylus. The second hardware interface 104 may include multiple such hardware interfaces, as illustrated in FIG. 1.

One or both of the first handle 101 and the second handle 102 may include a connector 125 for physical and electrical connection to the mobile device 199. The connector 125 may be, for example, a USB-C connector.

Figure 2:
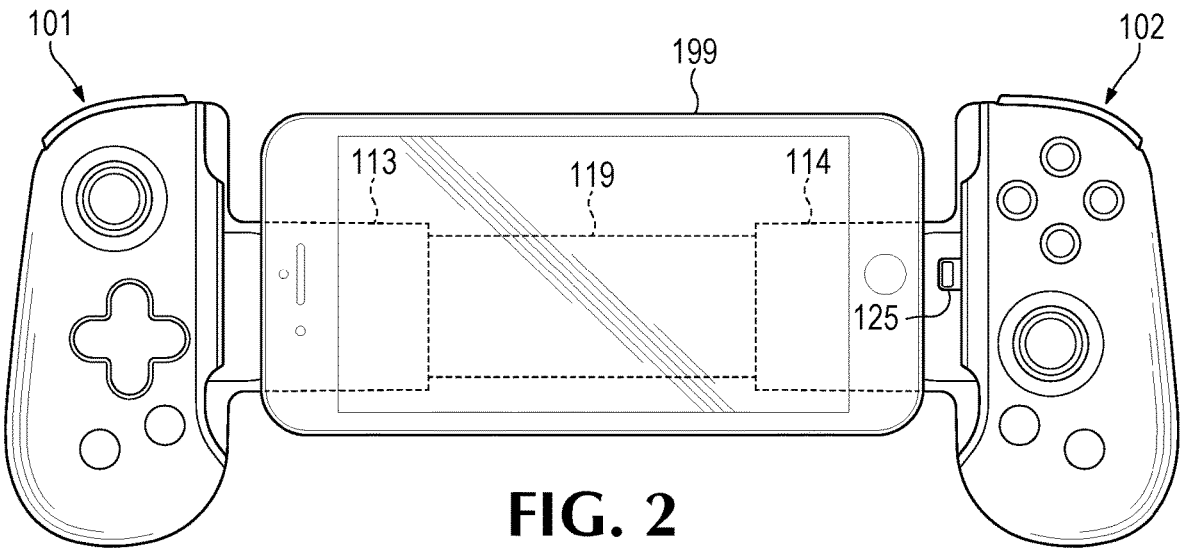
FIGS. 2-4 are each top views of the game controller of FIG. 1, collectively showing an example process of how the game controller may contact and support an example mobile device.
Figure 3:
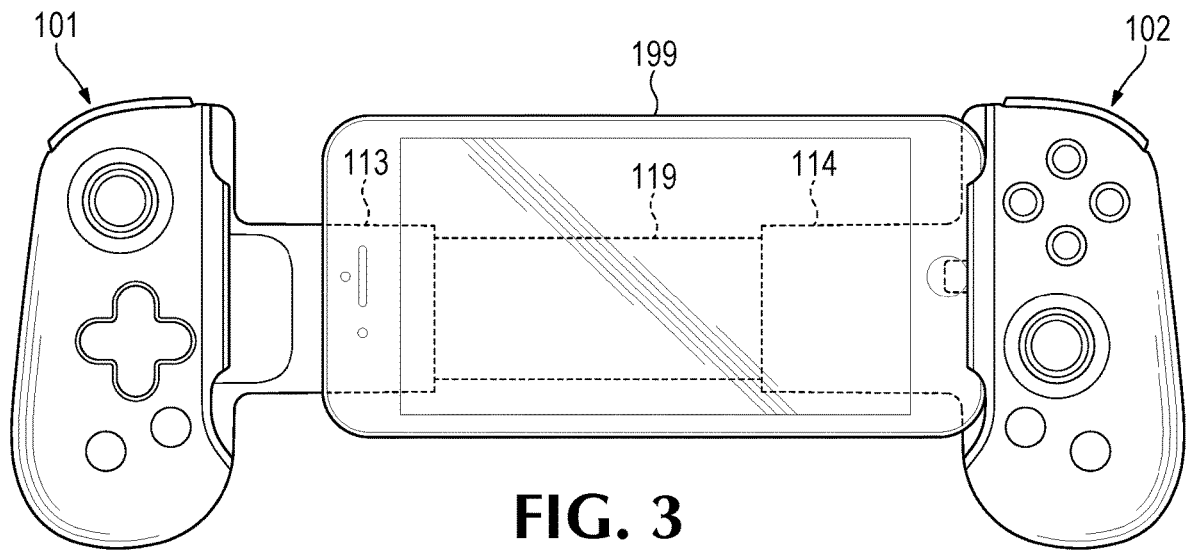
Figure 4:
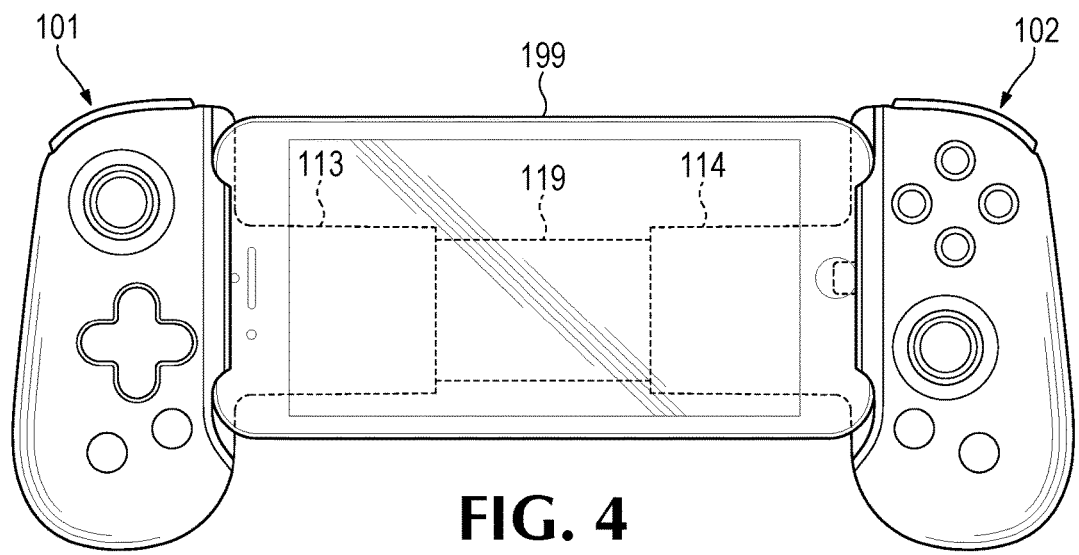

FIGS. 2-4 are top views of the game controller 100 of FIG. 1, showing an example process of how the game controller 100 may contact and support an example mobile device 199. As illustrated in FIG. 2, the mobile device 199 may be placed over the bridge 119, between the first handle 101 and the second handle 102 of the game controller 100. As illustrated in FIG. 3, the connector 125 of the game controller 100 may be joined with a corresponding connector on the mobile device 199. FIGS. 2 and 3 show examples of an extended configuration of the game controller 100. In FIG. 4, the mobile device 199 is secured between the first handle 101 and the second handle 102 of the game controller 100. FIG. 4 illustrates an example of a retracted configuration of the game controller 100. The extended configuration and the retracted configuration of the game controller 100 will be described in more detail below. The reader will note, though, that there is more than one retracted configuration. For example, FIG. 4 illustrates an example of a retracted configuration when the game controller 100 is securing a mobile device 199. As another example, FIG. 5 (described below) illustrates an example of a retracted configuration when the game controller 100 is not securing a mobile device 199.

FIG. 5 is a front, partial sectional view of the game controller 100 of FIG. 1 in an example of a retracted configuration of the game controller 100. FIG. 6 is a front, partial sectional view of the game controller 100 of FIG. 1 in an example of an extended configuration of the game controller 100. As illustrated in FIGS. 5-6, a game controller 100 may include a first handle 101, a second handle 102, and a bridge 119, each as described above for FIGS. 1-4. In each of FIGS. 5-6, external portions of the first handle 101, the second handle 102, and the bridge 119 are not shown to make certain internal features visible.

As illustrated, the bridge 119 is in sliding engagement with the first handle 101. As illustrated, the bridge 119 is not telescoping, meaning that segments of the bridge 119 do not slide within another segment of the bridge 119 to allow for lengthening or shortening of the bridge 119. The bridge 119 has a span 120 extending away from the main body portion 105 of the first handle 101, and the span 120 has a transverse midline 121.

The bridge 119 and the first handle 101 are configured to allow the main body portion 105 of the first handle 101 to translate in a retraction direction 122 toward the midline 121 of the bridge 119 and into a retracted configuration, such as one of the example retracted configurations illustrated in FIG. 4 or 5. The bridge 119 and the first handle 101 are configured to allow the main body portion 105 of the first handle 101 to also translate in an extension direction 123 away from the midline 121 of the bridge 119 into an extended configuration, such as one of the example extended configurations illustrated in FIG. 2 or 6.

As used in this disclosure, the transverse midline 121 of the bridge 119 is a reference datum used to define the extension direction 123 and the retraction direction 122. That is, the retraction direction 122 is toward the transverse midline 121, while the retraction direction 122 is away from the transverse midline 121. Accordingly, the transverse midline 121 of the bridge 119 may or may not coincide with a physical structure on the game controller 100.

Likewise, the bridge 119, as illustrated, is in sliding engagement with the second handle 102, and the span 120 of the bridge 119 extends away from the main body portion 106 of the second handle 102. The bridge 119 and the second handle 102 are configured to allow the main body portion 106 of the second handle 102 to translate in the retraction direction 122 toward the midline 121 of the bridge 119 and into the retracted configuration. The bridge 119 and the second handle 102 are configured to allow the main body portion 106 of the second handle 102 to also translate in the extension direction 123 away from the midline 121 of the bridge 119 into the extended configuration.

As illustrated in FIGS. 5-6, the game controller 100 may also include a first spring mechanism 107, a second spring mechanism 108, a first latch mechanism 109, a second latch mechanism 110, a first linear rack 111, a second linear rack 112, and a pinion 124. These are described below.

The first spring mechanism 107 is configured to bias the first handle 101 toward the retracted configuration. In addition, the first spring mechanism 107 exerts a first retraction force on the first latch mechanism 109 in the retraction direction 122. As illustrated, the first spring mechanism 107 may be attached to the first handle 101 through a shaft 117 and is also attached to the bridge 119. The first spring mechanism 107 may be or include a first constant-load spring connecting the first handle 101 to the bridge 119. The first constant-load spring is configured to exert a substantially constant force on the first handle 101 in the retraction direction 122. As used in this disclosure, "substantially constant" means largely or essentially invariable, yet without requiring perfect constancy, as the game controller 100 transitions from the retracted configuration to the extended configuration and from the extended configuration to the retracted configuration.

The second spring mechanism 108 is configured to bias the second handle 102 toward the retracted configuration. In addition, the second spring mechanism 108 exerts a second retraction force on the second latch mechanism 110 in the retraction direction 122. As illustrated, the second spring mechanism 108 is attached to the second handle 102 through a shaft 118 and is also attached to the bridge 119. The second spring mechanism 108 may be or include a second constant-load spring connecting the second handle 102 to the bridge 119. The second constant-load spring is configured to exert a substantially constant force on the second handle 102 in the retraction direction 122.

The first latch mechanism 109 is configured to temporarily lock the bridge 119 in the extended configuration. The first latch mechanism 109 is further configured to require a first disengagement force in the retraction direction 122 to unlock the bridge 119 from the extended configuration. The first disengagement force is greater than the first retraction force exerted by the first spring mechanism 107 in the retraction direction 122. The additional force (that is, that portion of the first disengagement force that exceeds the first retraction force) may be provided by, for example, pressure from the user's hands exerted in the retraction direction 122.

Likewise, the second latch mechanism 110 is configured to temporarily lock the bridge 119 in the extended configuration. The second latch mechanism 110 is further configured to require a second disengagement force in the retraction direction 122 to unlock the bridge 119 from the extended configuration. The second disengagement force is greater than the second retraction force exerted by the second spring mechanism 108 in the retraction direction 122. The additional force (that is, that portion of the second disengagement force that exceeds the second retraction force) may be provided by, for example, pressure from the user's hands exerted in the retraction direction 122.

As illustrated, the first linear rack 111 is coupled to the first handle 101 and is in sliding engagement with the bridge 119. The first linear rack 111 extends substantially along the span 120 of the bridge 119. As used in this disclosure, "substantially along" means largely or essentially in the direction of, without requiring perfect conformity. The first linear rack 111 may further include a step 126 or indentation, which may engage with the first latch mechanism 109 as described more fully below. As used in this disclosure, "to engage" means "to interlock with; to fit together."

The second linear rack 112 is coupled to the second handle 102 and is in sliding engagement with the bridge 119. The second linear rack 112 extends substantially along the span 120 of the bridge 119. The second linear rack 112 may further include a step 126, which may engage with the second latch mechanism 110 as described more fully below.

As illustrated, the pinion 124 is affixed to the bridge 119. The pinion 124 is in contact with each of the first linear rack 111 and the second linear rack 112. The pinion 124 is configured to rotate relative to the bridge 119 as the first linear rack 111 is translated relative to the pinion 124. The pinion 124 is also configured to rotate as the second linear rack 112 is translated relative to the pinion 124.

Figure 7:
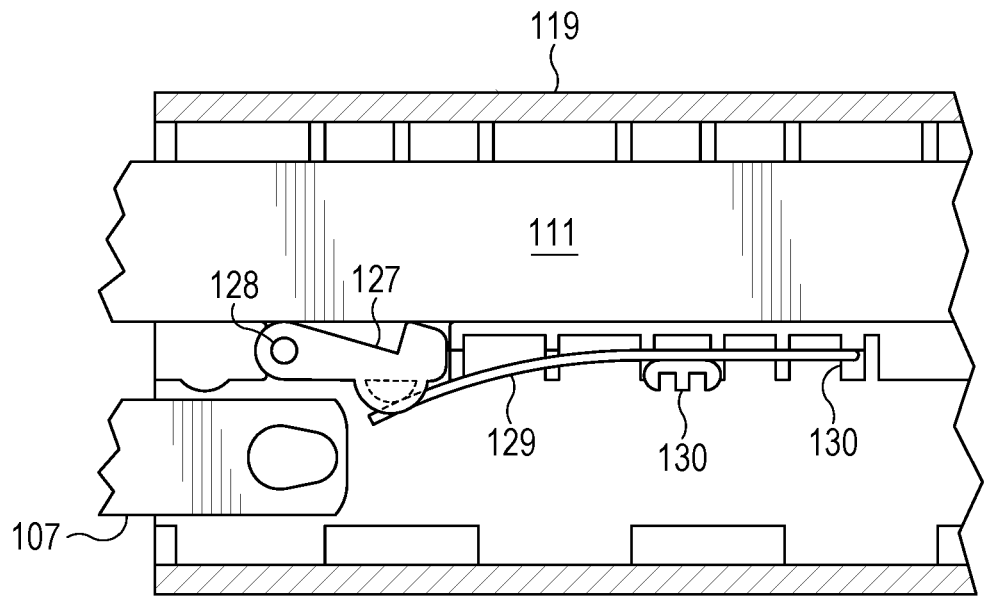
FIG. 7 is a close-up of a portion of the game controller of FIGS. 5 and 6, illustrating an example latch mechanism in an unlatched configuration.
Figure 8:
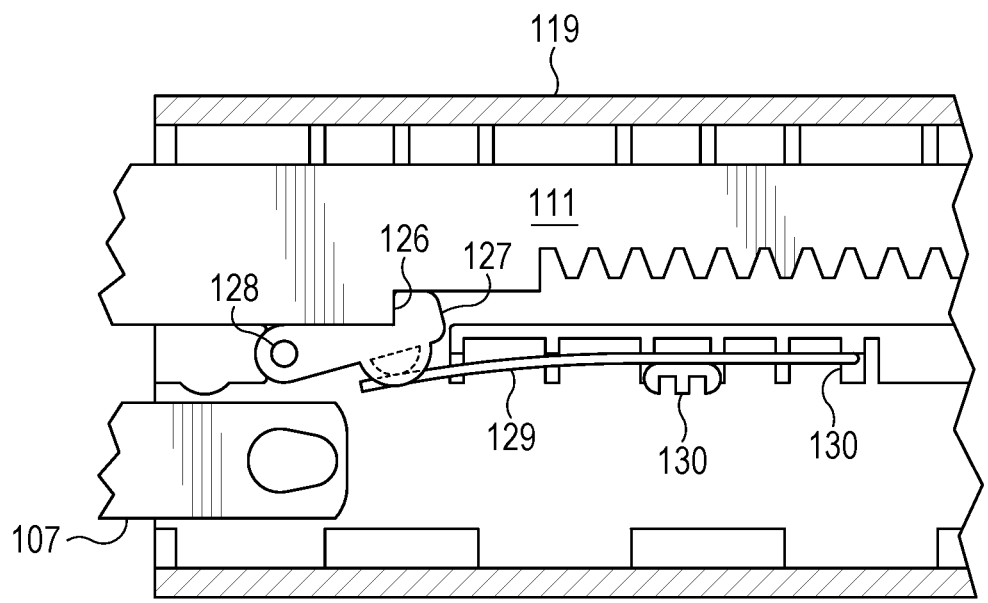
FIG. 8 is a close-up of a portion of the game controller of FIGS. 5 and 6, illustrating the example latch mechanism of FIG. 7 in a latched configuration.

FIG. 7 is a close-up of a portion of the game controller 100 of FIGS. 5 and 6, illustrating an example latch mechanism in an unlatched configuration. FIG. 8 is a close-up of a portion of the game controller 100 of FIGS. 5 and 6, illustrating the example latch mechanism of FIG. 7 in a latched configuration. While illustrated and described for the first-handle side of the game controller 100, the discussion for FIGS. 7 and 8 applies equally to the second-handle side of the game controller 100. Hence, the example latch mechanism of FIGS. 7 and 8 may be the first latch mechanism 109 described above for FIGS. 5 and 6, the second latch mechanism 110 described above for FIGS. 5 and 6, or both the first latch mechanism 109 and the second latch mechanism 110.

As illustrated in FIGS. 7 and 8, the example latch mechanism may include a catch 127 coupled to the bridge 119. The catch 127 is configured to contact and engage the step 126 on the first linear rack 111 in the extended configuration and disengage from the step 126 on the first linear rack 111 in the retracted configuration. To facilitate the engagement and disengagement of the catch 127 from the step 126, the step 126 may be angled or rounded, or a portion of the catch 127 facing the step 126 may be angled or rounded, or both.

As illustrated, the catch 127 is coupled to the bridge 119 through a pivot 128. The first latch mechanism 109 may also include a cantilevered spring 129 configured to apply a torque to the catch 127 about the pivot 128 to bias the catch 127 against the first linear rack 111. The cantilevered spring 129 may be coupled to the bridge 119 by one or more attachment points 130.

With particular reference to FIGS. 2-8, in use the game controller 100 may initially be in a retracted configuration, such as the retracted configuration illustrated in FIG. 5. In the retracted configuration, the catch 127 is disengaged from the step 126 on the first linear rack 111. In versions having a catch 127 on a second linear rack 112 (also or instead of the catch 127 on the first linear rack 111), in the retracted configuration, the catch 127 is disengaged from the step 126 on the second linear rack 112.

Then, the user may apply a force (using, for example, the user's hands) to the first handle 101 or the second handle 102, or both, in the extension direction 123 to move the game controller 100 into an extended configuration, such as the extended configurations illustrated in FIGS. 1, 2, and 6. In other words, the user may pull the first handle 101 and the second handle 102 apart from each other.

In transitioning to the extended configuration, the first linear rack 111 slides relative to the catch 127 for the first end 115 of the span 120 until that catch 127 is aligned with the step 126 in the first linear rack 111. During the transition, the first spring mechanism 107 continues to bias the first handle 101 toward the retracted configuration and exerts a first retraction force on the first latch mechanism 109 in the retraction direction 122. The cantilevered spring 129 then causes the catch 127 for the first end 115 of the span 120 to engage the step 126 of the first linear rack 111 by forcing the catch 127 into the step 126. The first latch mechanism 109 is now temporarily locking the bridge 119 in the extended configuration by way of the catch 127.

In versions having a catch 127 on a second linear rack 112 (also or instead of the catch 127 on the first linear rack 111), in transitioning to the extended configuration, the second linear rack 112 slides relative to the catch 127 for the second end 116 of the span 120 until the catch 127 is aligned with the step 126 in the second linear rack 112. During the transition, the second spring mechanism 108 continues to bias the second handle 102 toward the retracted configuration and exerts a second retraction force on the second latch mechanism 110 in the retraction direction 122. The cantilevered spring 129 then causes the catch 127 for the second end 116 of the span 120 to engage the step 126 of the second linear rack 112 by forcing the catch 127 into the step 126. The second latch mechanism 110 is now temporarily locking the bridge 119 in the extended configuration by way of the catch 127.

With the bridge 119 temporarily locked in the extended configuration, the user may then insert a mobile device 199 into the game controller 100 by placing the mobile device 199 over the bridge 119, such as illustrated in FIG. 2. If necessary, the connector 125 of the game controller 100 may then be joined with a corresponding connector on the mobile device 199, such as illustrated in FIG. 3.

To unlock the hold-open feature, where the bridge 119 is temporarily locked in the extended configuration, and return the game controller 100 to a retracted configuration, the user typically applies a force to the first handle 101 in the retraction direction 122. This user-applied force, coupled with the first retraction force exerted by the first spring mechanism 107, causes the catch 127 for the first end 115 of the span 120 to disengage from the step 126 in the first linear rack 111. Once disengaged, the first retraction force exerted by the first spring mechanism 107 causes the game controller 100 to transition to a retracted configuration.

In versions having a catch 127 on a second linear rack 112 (also or instead of the catch 127 on the first linear rack 111), the user may apply a force to the second handle 102 in the retraction direction 122. This user-applied force, coupled with the second retraction force exerted by the second spring mechanism 108, causes the catch 127 for the second end 116 of the span 120 to disengage from the step 126 in the second linear rack 112. Once disengaged, the second retraction force exerted by the second spring mechanism 108 causes the game controller 100 to transition to a retracted configuration.

Since moving the game controller 100 from the retracted configuration to the extended configuration is often done by using both of the user's hands (such as, for example, one hand on each of the first handle 101 and the second handle 102), the hold-open feature allows the user—once the game controller 100 is temporarily locked in the extended configuration—to remove one or both of the user's hands from the game controller 100 (such as, for example, from either the first handle 101 or the second handle 102, or both) to manipulate the mobile device 199 into position, such as the position illustrated in FIG. 2. Hence, embodiments of the disclosed technology allow the user to efficiently and easily insert and remove a mobile device 199 from the game controller 100.

Figure 9:
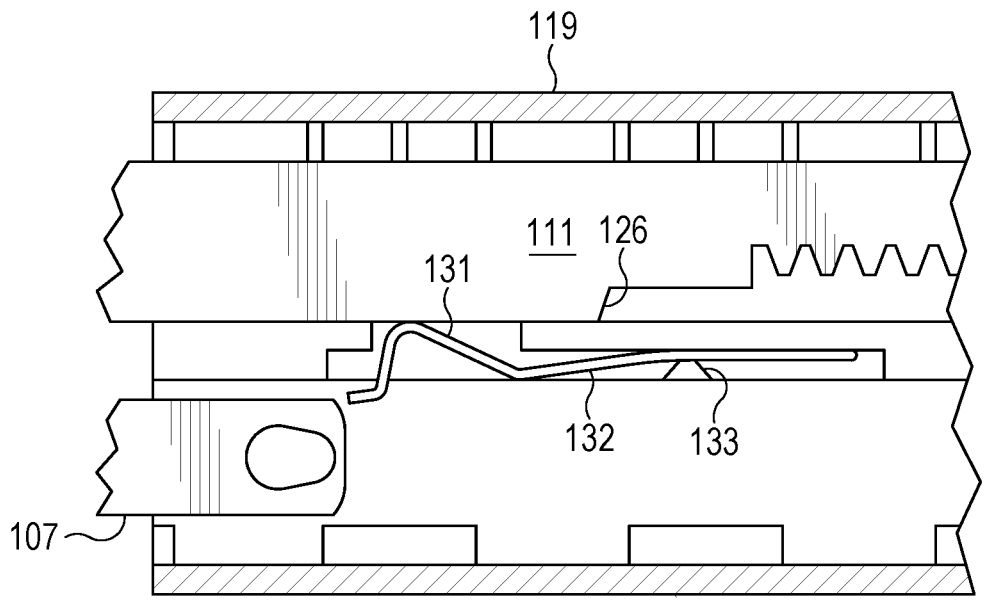
FIG. 9 is a close-up of a portion of a first alternative arrangement for the game controller of FIGS. 5 and 6, illustrating an example latch mechanism in an unlatched configuration.
Figure 10:
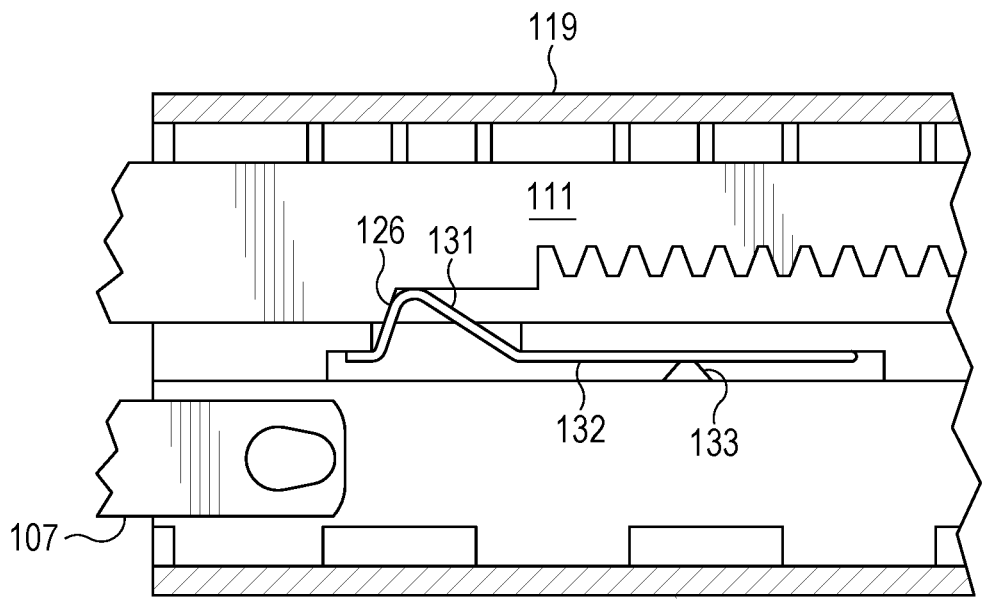
FIG. 10 is a close-up of a portion of a first alternative arrangement for the game controller of FIGS. 5 and 6, illustrating the example latch mechanism of FIG. 9 in a latched configuration.

FIG. 9 is a close-up of a portion of an alternative arrangement for the game controller 100 of FIGS. 5 and 6, illustrating an example latch mechanism in an unlatched configuration. FIG. 10 is a close-up of a portion of an alternative arrangement for the game controller 100 of FIGS. 5 and 6, illustrating the example latch mechanism of FIG. 9 in a latched configuration. While illustrated and described for the first-handle side of the game controller 100, the discussion for FIGS. 9 and 10 applies equally to the second-handle side of the game controller 100. Hence, the example latch mechanism of FIGS. 9 and 10 may be the first latch mechanism 109 described above for FIGS. 5 and 6, the second latch mechanism 110 described above for FIGS. 5 and 6, or both the first latch mechanism 109 and the second latch mechanism 110.

As illustrated in FIGS. 9 and 10, the example latch mechanism may include a tension spring 132 coupled to the bridge 119. An engagement portion 131 of the tension spring 132 is configured to contact and engage the step 126 on the first linear rack 111 in the extended configuration and disengage from the step 126 on the first linear rack 111 in the retracted configuration. To facilitate the engagement and disengagement of the catch 127 from the step 126, the step 126 may be angled or rounded.

As illustrated, the tension spring 132 is coupled to the bridge 119 through one or more attachment points 133. The tension spring 132 is configured to bias the engagement portion 131 of the tension spring 132 against the first linear rack 111. The engagement portion 131 is configured to engage the step 126 in the extended configuration.

Accordingly, in transitioning from the retracted configuration (an example of which is illustrated in FIG. 9) to the extended configuration (an example of which is illustrated in FIG. 10), the first linear rack 111 slides relative to the engagement portion 131 of the tension spring 132 until the engagement portion 131 is aligned with the step 126 in the first linear rack 111. The tension spring 132 then causes the engagement portion 131 to engage the step 126 of the first linear rack 111 by forcing the engagement portion 131 into the step 126. Likewise, in transitioning from the extended configuration to the retracted configuration, the engagement portion 131 of the tension spring 132 is disengaged from the step 126 in the first linear rack 111. Otherwise, operation of this example latch mechanism is substantially as described above for FIGS. 2-8.

Figure 11:
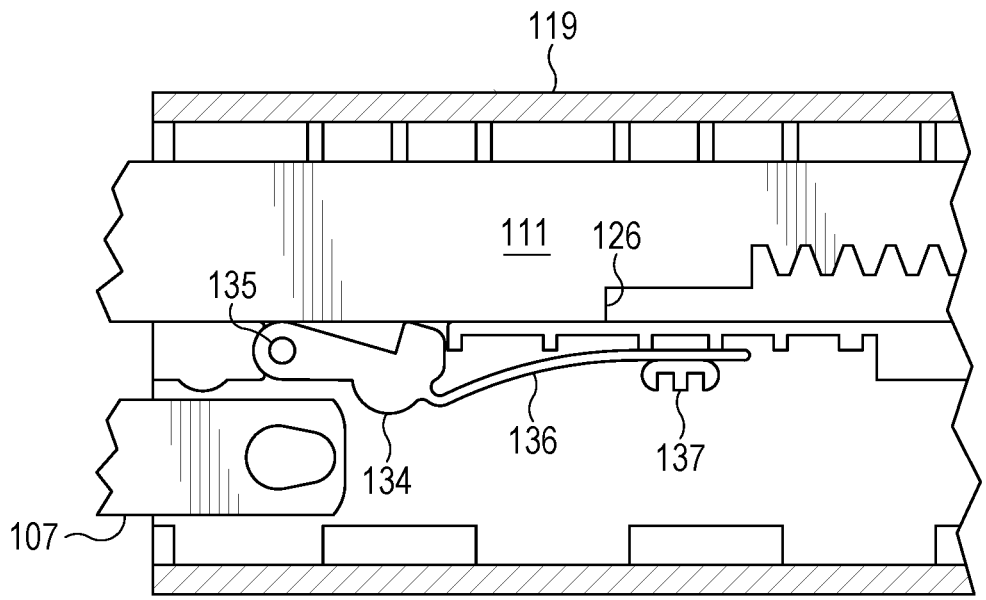
FIG. 11 is a close-up of a portion of a second alternative arrangement for the game controller of FIGS. 5 and 6, illustrating an example latch mechanism in an unlatched configuration.
Figure 12:
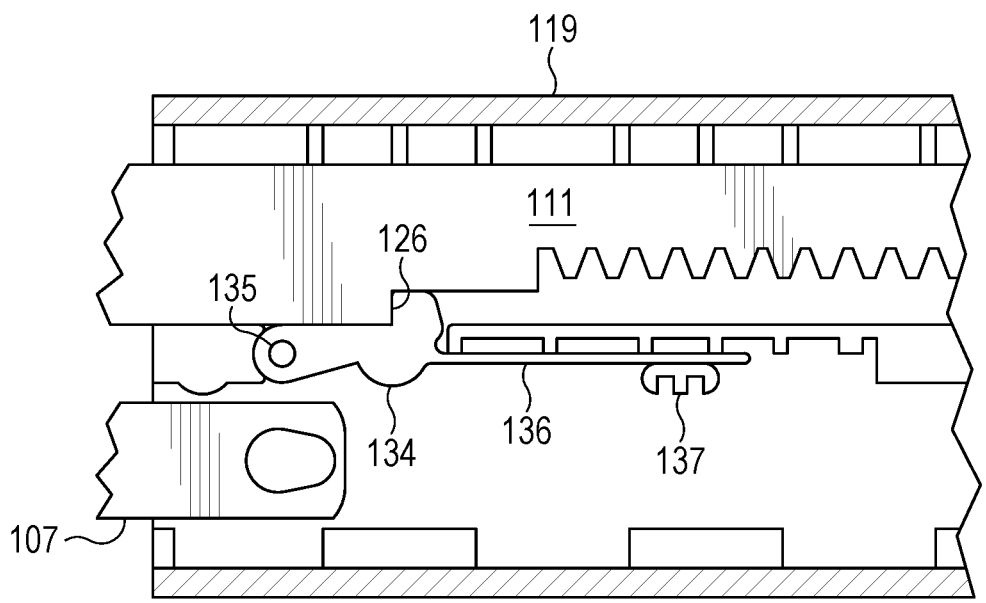
FIG. 12 is a close-up of a portion of a second alternative arrangement for the game controller of FIGS. 5 and 6, illustrating the example latch mechanism of FIG. 11 in a latched configuration.

FIG. 11 is a close-up of a portion of an alternative arrangement for the game controller 100 of FIGS. 5 and 6, illustrating an example latch mechanism in an unlatched configuration. FIG. 12 is a close-up of a portion of an alternative arrangement for the game controller 100 of FIGS. 5 and 6, illustrating the example latch mechanism of FIG. 11 in a latched configuration. While illustrated and described for the first-handle side of the game controller 100, the discussion for FIGS. 11 and 12 applies equally to the second-handle side of the game controller 100. Hence, the example latch mechanism of FIGS. 11 and 12 may be the first latch mechanism 109 described above for FIGS. 5 and 6, the second latch mechanism 110 described above for FIGS. 5 and 6, or both the first latch mechanism 109 and the second latch mechanism 110.

As illustrated in FIGS. 11 and 12, the example latch mechanism may include a catch 134 coupled to the bridge 119. The catch 134 is configured to contact and engage the step 126 on the first linear rack 111 in the extended configuration and disengage from the step 126 on the first linear rack 111 in the retracted configuration. To facilitate the engagement and disengagement of the catch 134 from the step 126, the step 126 may be angled or rounded, or a portion of the catch 134 facing the step 126 may be angled or rounded, or both.

As illustrated, the catch 134 is coupled to the bridge 119 through a pivot 135. The first latch mechanism 109 may also include a cantilevered spring 136 configured to apply a torque to the catch 134 about the pivot 135 to bias the catch 134 against the first linear rack 111. As illustrated, the cantilevered spring 136 may be integral to and extend from the catch 134. Accordingly, the cantilevered spring 136 may be configured to slide through one or more guide points 137 of the bridge 119, which constrain an end of the cantilevered spring 136 opposite the catch 134.

Operation of this example latch mechanism is substantially as described above for FIGS. 2-8.

Figure 13:
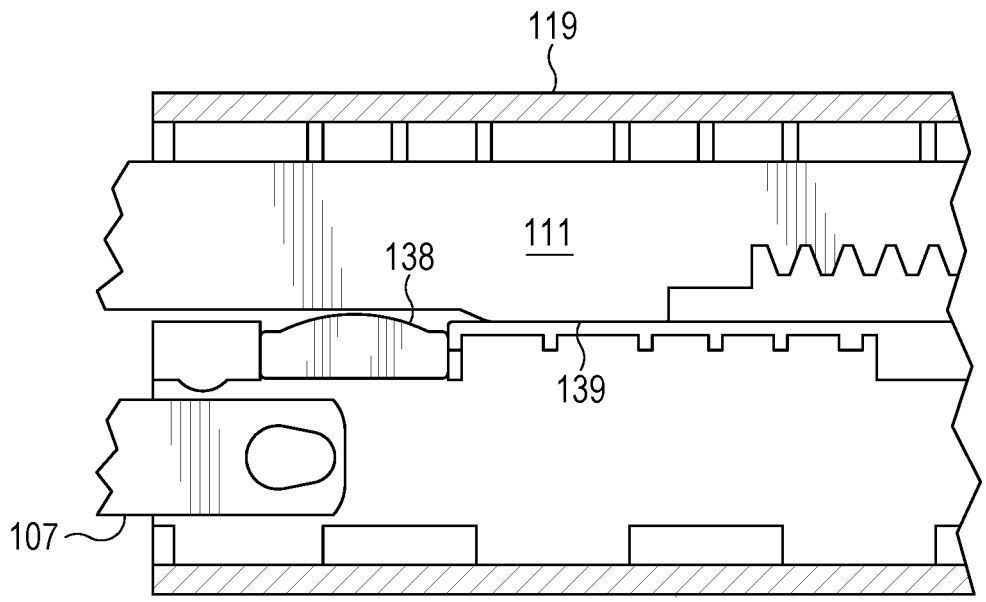
FIG. 13 is a close-up of a portion of a third alternative arrangement for the game controller of FIGS. 5 and 6, illustrating an example latch mechanism in an unlatched configuration.
Figure 14:
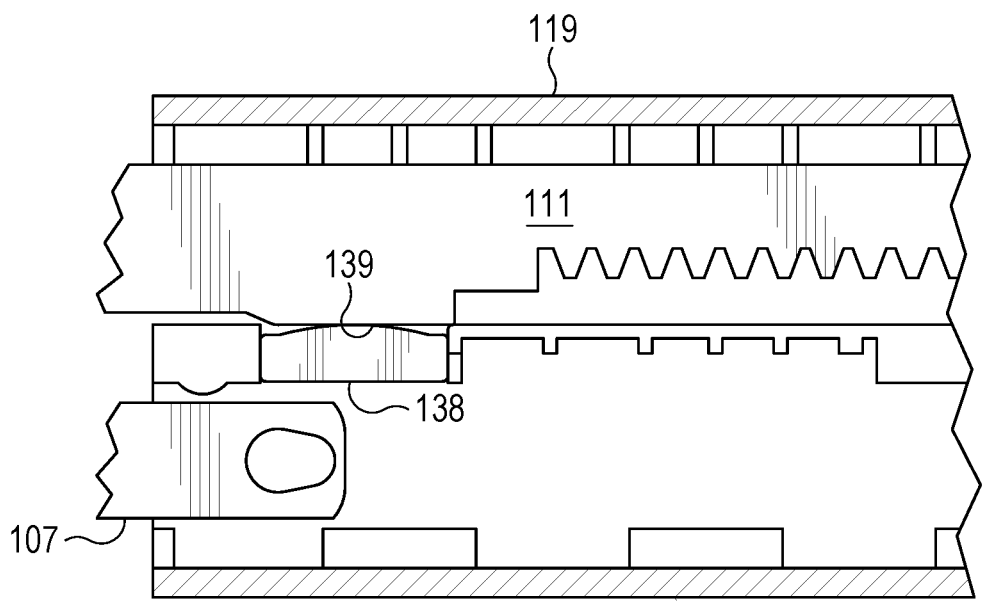
FIG. 14 is a close-up of a portion of a third alternative arrangement for the game controller of FIGS. 5 and 6, illustrating the example latch mechanism of FIG. 13 in a latched configuration.

FIG. 13 is a close-up of a portion of an alternative arrangement for the game controller 100 of FIGS. 5 and 6, illustrating an example latch mechanism in an unlatched configuration. FIG. 14 is a close-up of a portion of an alternative arrangement for the game controller 100 of FIGS. 5 and 6, illustrating the example latch mechanism of FIG. 13 in a latched configuration. While illustrated and described for the first-handle side of the game controller 100, the discussion for FIGS. 13 and 14 applies equally to the second-handle side of the game controller 100. Hence, the example latch mechanism of FIGS. 13 and 14 may be the first latch mechanism 109 described above for FIGS. 5 and 6, the second latch mechanism 110 described above for FIGS. 5 and 6, or both the first latch mechanism 109 and the second latch mechanism 110.

As illustrated in FIGS. 13 and 14, the example latch mechanism may include an elastic body 138 coupled to the bridge 119. The elastic body 138 is configured to contact and frictionally engage a raised portion 139 on the first linear rack 111 in the extended configuration and disengage from the raised portion 139 in the retracted configuration. To facilitate the engagement and disengagement of the elastic body 138 from the raised portion 139, the raised portion 139 may be angled or rounded, or the raised portion 139 may be angled or rounded, or both. As illustrated, the elastic body 138 is configured to elastically distort when engaged with the raised portion 139 of the first linear rack 111.

Accordingly, in transitioning from the retracted configuration (an example of which is illustrated in FIG. 13) to the extended configuration (an example of which is illustrated in FIG. 14), the first linear rack 111 slides relative to the elastic body 138 until the elastic body 138 contacts the raised portion 139 of the first linear rack 111. The elastic body 138 then elastically distorts and frictionally engages the raised portion 139 on the first linear rack 111. Likewise, in transitioning from the extended configuration to the retracted configuration, the elastic body 138 is disengaged from the raised portion 139 of the first linear rack 111. Otherwise, operation of this example latch mechanism is substantially as described above for FIGS. 2-8.

Figure 15:
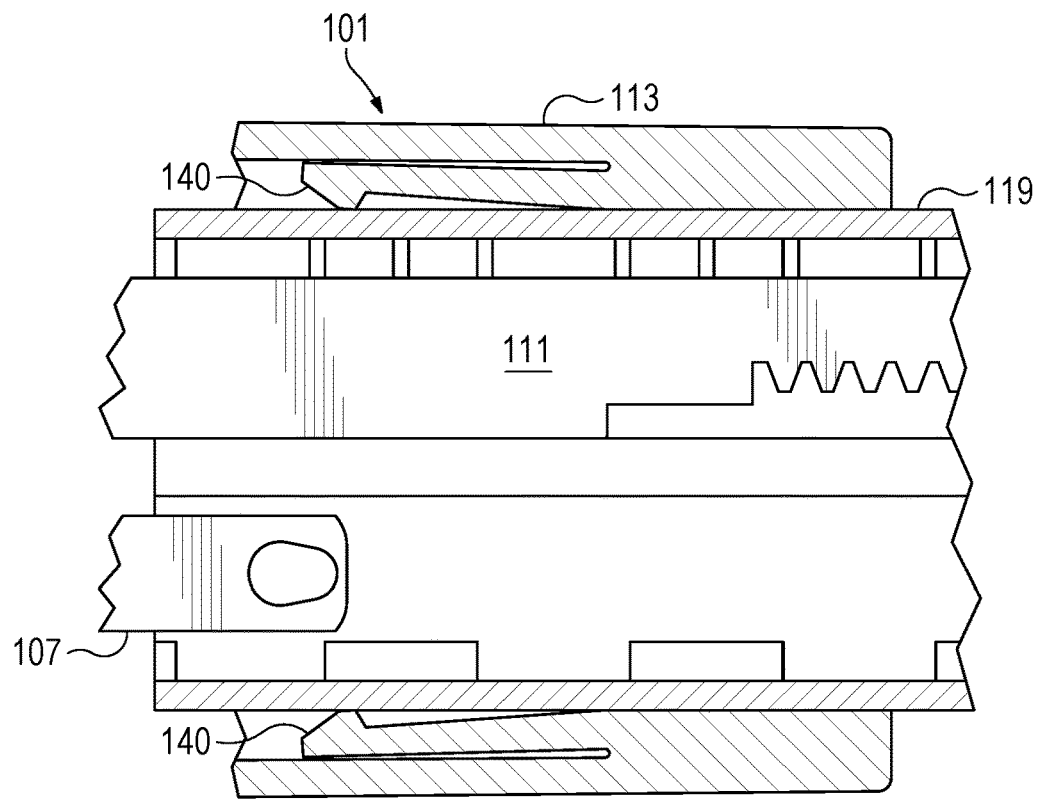
FIG. 15 is a close-up of a portion of a fourth alternative arrangement for the game controller of FIGS. 5 and 6, illustrating an example latch mechanism in an unlatched configuration.
Figure 16:
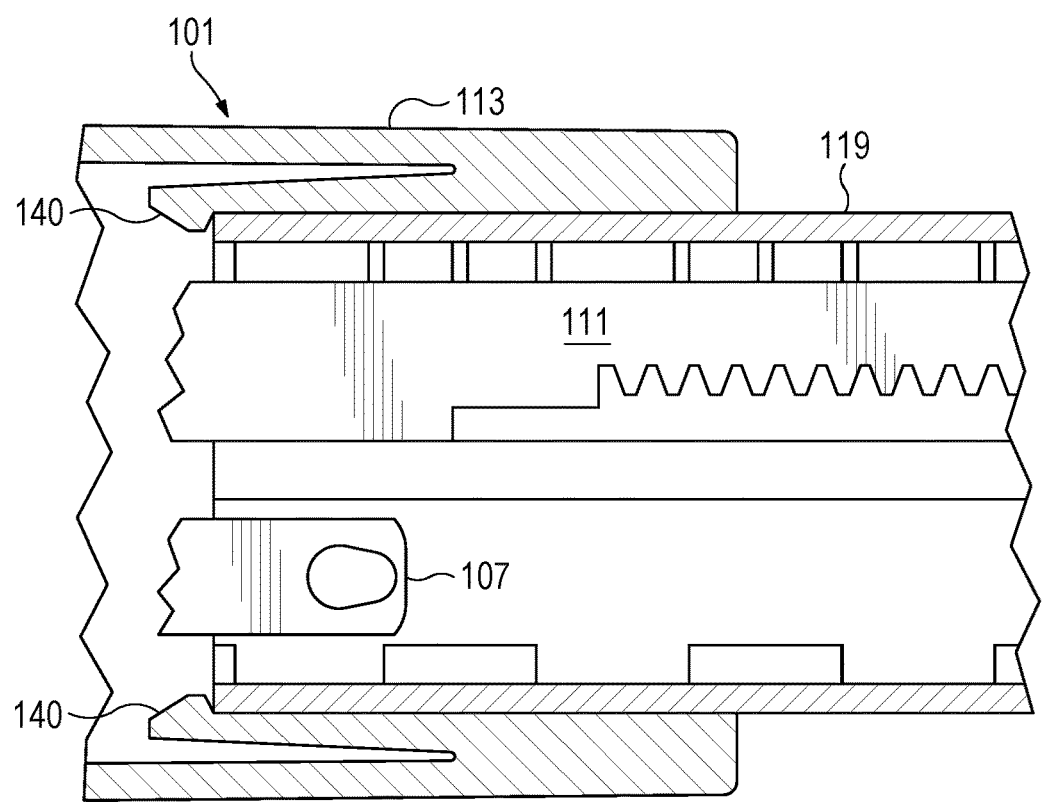
FIG. 16 is a close-up of a portion of a fourth alternative arrangement for the game controller of FIGS. 5 and 6, illustrating the example latch mechanism of FIG. 15 in a latched configuration.

FIG. 15 is a close-up of a portion of an alternative arrangement for the game controller 100 of FIGS. 5 and 6, illustrating an example latch mechanism in an unlatched configuration. FIG. 16 is a close-up of a portion of an alternative arrangement for the game controller 100 of FIGS. 5 and 6, illustrating the example latch mechanism of FIG. 15 in a latched configuration. While illustrated and described for the first-handle side of the game controller 100, the discussion for FIGS. 15 and 16 applies equally to the second-handle side of the game controller 100. Hence, the example latch mechanism of FIGS. 15 and 16 may be the first latch mechanism 109 described above for FIGS. 5 and 6, the second latch mechanism 110 described above for FIGS. 5 and 6, or both the first latch mechanism 109 and the second latch mechanism 110.

As illustrated in FIGS. 15 and 16, the example latch mechanism may include one or more resilient clips 140 on the first handle 101. As illustrated, the resilient clip 140 may be within the guide portion 113 of the first handle 101. The resilient clip 140 is configured to contact and engage an outer edge of the bridge 119 in the extended configuration and to disengage from the outer edge of the bridge 119 in the retracted configuration. To facilitate the engagement and disengagement of the resilient clip 140 from the outer edge of the bridge 119, the resilient clip 140 may be angled or rounded, the outer edge may be angled or rounded, or both. The resilient clip 140 is biased against the outer edge of the bridge 119. As illustrated in FIG. 15, the resilient clips 140 may be disengaged from the outer edge of the bridge 119 while still being in contact with the outer edge.

As illustrated in FIG. 16, the resilient clip 140 engages a terminus of the bridge 119. In other embodiments, the resilient clip 140 may engage an indentation or step on the outer edge of the bridge 119, the indentation or step not being at the terminus of the bridge 119.

Alternatively, one or more resilient clips 140 may be on the bridge 119 and be configured to contact and engage the first handle 101 in the extended configuration and to disengage from the first handle 101 in the retracted configuration.

With specific reference to the embodiment illustrated in FIGS. 15 and 16, in transitioning from the retracted configuration (an example of which is illustrated in FIG. 15) to the extended configuration (an example of which is illustrated in FIG. 16), the bridge 119 slides relative to the first handle 101 until the resilient clip 140 engages the terminus of the bridge 119. Likewise, in transitioning from the extended configuration to the retracted configuration, the resilient clip 140 is disengaged from the terminus of the bridge 119. Otherwise, operation of this example latch mechanism is analogous to what is described above for FIGS. 2-8.

EXAMPLES

Illustrative examples of the disclosed technologies are provided below. An embodiment of the technologies may include one or more, and any combination of, the examples described below.

Example 1 includes a game controller for a mobile device, the game controller comprising: a first handle configured to contact and support a mobile device, the first handle comprising a user-accessible, first hardware interface on a main body portion of the first handle and configured to accept touch inputs; a bridge in sliding engagement with the first handle, the bridge having a span extending away from the main body portion of the first handle, the span having a transverse midline, the bridge and the first handle being configured for the main body portion of the first handle to translate in a retraction direction toward the midline of the bridge and into a retracted configuration and also to translate in an extension direction away from the midline of the bridge into an extended configuration; a first spring mechanism configured to bias the first handle toward the retracted configuration; and a first latch mechanism configured to temporarily lock the bridge in the extended configuration.

Example 2 includes the game controller of Example 1, the first latch mechanism being further configured to require a first disengagement force in the retraction direction to unlock the bridge from the extended configuration, the first disengagement force being greater than a first retraction force exerted on the first latch mechanism in the retraction direction by the first spring mechanism.

Example 3 includes the game controller of any of Examples 1-2, further comprising: a first linear rack coupled to the first handle and in sliding engagement with the bridge, the first linear rack extending substantially along the span of the bridge; and a pinion affixed to the bridge and in contact with the first linear rack, the pinion configured to rotate relative to the bridge as the first linear rack is translated relative to the pinion.

Example 4 includes the game controller of any of Examples 1-3, in which the first spring mechanism comprises a first constant-load spring connecting the first handle to the bridge, the first constant-load spring configured to exert a substantially constant force in the retraction direction.

Example 5 includes the game controller of any of Examples 1-4, in which the first latch mechanism comprises a catch coupled to the bridge and configured to contact and engage a step on the first linear rack in the extended configuration and disengage the step on the first linear rack in the retracted configuration.

Example 6 includes the game controller of Example 5, in which the catch is pivotally coupled to the bridge, the first latch mechanism further comprising a cantilevered spring configured to apply a torque to the catch to bias the catch against the first linear rack.

Example includes the game controller of Example 6, in which the cantilevered spring is integral to and extends from the catch.

Example 8 includes the game controller of Example 5, in which the catch comprises a tension spring having an engagement portion, the tension spring configured to bias the engagement portion against the first linear rack, the engagement portion configured to engage the step in the extended configuration.

Example 9 includes the game controller of any of Examples 1-4, in which the first latch mechanism comprises an elastic body coupled to the bridge and configured to contact and frictionally engage a raised portion on the first linear rack in the extended configuration and disengage the raised portion on the first linear rack in the retracted configuration, the elastic body configured to elastically distort when engaged with the raised portion of the first linear rack.

Example 10 includes the game controller of any of Examples 1-4, in which the first latch mechanism comprises a resilient clip on the first handle, the resilient clip configured to contact and engage an outer edge of the bridge in the extended configuration and disengage from the outer edge of the bridge in the retracted configuration.

Example 11 includes the game controller of Example 10, in which a guide portion of the first handle extends from the main body portion of the first handle and along a first end of the span of the bridge, the guide portion of the first handle configured to align the bridge with the main body portion of the first handle, and in which the resilient clip is within the guide portion of the first handle.

Example 12 includes the game controller of any of Examples 1-11, in which a guide portion of the first handle extends from the main body portion of the first handle and along a first end of the span of the bridge, the guide portion of the first handle configured to align the bridge with the main body portion of the first handle.

Example 13 includes the game controller of any of Examples 1-12, further comprising: a second handle configured to contact and support the mobile device, the second handle comprising a user-accessible, second hardware interface on a main body portion of the second handle and configured to accept touch inputs, the bridge being in sliding engagement with the second handle, the midline of the bridge being between the first handle and the second handle, the bridge and the second handle being configured for the main body portion of the second handle to translate along the bridge in the retraction direction toward the midline of the bridge and into the retracted configuration and also to translate in the extension direction away from the midline of the bridge and into the extended configuration; a second spring mechanism configured to bias the second handle toward the retracted configuration; and a second latch mechanism configured to temporarily lock the bridge in the extended configuration.

Example 14 includes the game controller of Example 13, the second latch mechanism being further configured to require a second disengagement force in the retraction direction to unlock the bridge from the extended configuration, the second disengagement force being greater than a second retraction force exerted on the second latch mechanism in the retraction direction by the second spring mechanism.

Example 15 includes the game controller of any of Examples 13-14, further comprising a second linear rack coupled to the second handle and in sliding engagement with the bridge, the second linear rack extending substantially along the span of the bridge, the pinion being in contact with the second linear rack, the pinion further configured to rotate relative to the bridge as the second linear rack is translated relative to the pinion.

Example 16 includes the game controller of any of Examples 13-15, in which the second spring mechanism comprises a second constant-load spring connecting the second handle to the bridge, the second constant-load spring configured to exert a substantially constant force in the retraction direction.

Example 17 includes the game controller of any of Examples 13-16, in which a guide portion of the second handle extends from the main body portion of the second handle and along a second end of the span of the bridge, the guide portion of the second handle configured to align the bridge with the main body portion of the second handle.

Example 18 includes a method for engaging a mobile device with a game controller, the method including: moving a first handle in an extension direction along a bridge in sliding engagement with the first handle from a retracted configuration to an extended configuration, the first handle configured to contact and support the mobile device, the first handle comprising a user-accessible, first hardware interface on a main body portion of the first handle and configured to accept touch inputs, the extension direction being away from a transverse midline of the bridge; temporarily locking, with a first mechanism coupled to the bridge, the first handle in the extended configuration; positioning the mobile device to contact and be supported by the game controller; unlocking, by disengaging the first mechanism, the first handle from the extended configuration; and moving, via a first force mechanism coupled to the first handle, the first handle toward the retracted configuration.

Example 19 includes the method of Example 18, further comprising: before positioning the mobile device to contact and be supported by the game controller: moving a second handle of the game controller in the extension direction, the second handle configured to contact and support the mobile device, the second handle comprising a user-accessible, second hardware interface on a main body portion of the second handle and configured to accept touch inputs, and temporarily locking, with a second mechanism coupled to the bridge, the second handle in the extended configuration; and after positioning the mobile device to contact and be supported by the game controller, unlocking, by disengaging the second mechanism, the second handle from the extended configuration, and moving, via a second force mechanism coupled to the second handle, the second handle toward the retracted configuration.

The previously described versions of the disclosed subject matter have many advantages that were either described or would be apparent to a person of ordinary skill. Even so, all of these advantages or features are not required in all versions of the disclosed apparatus, systems, or methods. For example, not all contemplated embodiments will include the second handle. As another example, not all contemplated embodiments having the second handle will include the second latch mechanism or the second spring mechanism. As another example, not all contemplated embodiments will include the connector of the game controller if, for example, the mobile device and the game controller communicate wirelessly.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method having two or more defined steps or operations, the defined steps or operations can be carried out in any order or simultaneously, unless the context excludes those possibilities.

Furthermore, the term "comprises" and its grammatical equivalents are used in this application to mean that other components, features, steps, processes, operations, etc. are optionally present. For example, an article "comprising" or "which comprises" components A, B, and C can contain only components A, B, and C, or it can contain components A, B, and C along with one or more other components.

Although specific embodiments have been illustrated and described for purposes of illustration, it will be understood that various modifications may be made without departing from the spirit and scope of the disclosure. Accordingly, the invention should not be limited except as by the appended claims.

We claim:

1. A game controller for a mobile device, the game controller comprising:
    a first handle configured to contact and support a mobile device, the first handle comprising a user-accessible, first hardware interface on a main body portion of the first handle and configured to accept touch inputs;
    a bridge having a span extending away from the main body portion of the first handle, the span having a transverse midline, the bridge and the first handle being configured for the main body portion of the first handle to translate in a retraction direction toward the midline of the bridge and into a retracted configuration and also to translate in an extension direction away from the transverse midline of the bridge into an extended configuration, in which a guide portion of the first handle extends from the main body portion of the first handle and along a first end of the span of the bridge, the guide portion of the first handle configured to align the bridge with the main body portion of the first handle, the bridge being in sliding engagement with the guide portion of the first handle;
    a first spring mechanism configured to bias the first handle toward the retracted configuration; and
    a first latch mechanism configured to temporarily lock the bridge in the extended configuration.

2. The game controller of claim 1, in which the first latch mechanism comprises an elastic body coupled to the bridge and configured to contact and frictionally engage a raised portion on the first linear rack in the extended configuration and disengage the raised portion on the first linear rack in the retracted configuration, the elastic body configured to elastically distort when engaged with the raised portion of the first linear rack.

3. The game controller of claim 1, in which the first latch mechanism comprises a resilient clip on the first handle, the resilient clip configured to contact and engage an outer edge of the bridge in the extended configuration and disengage from the outer edge of the bridge in the retracted configuration.

4. The game controller of claim 3, in which a guide portion of the first handle extends from the main body portion of the first handle and along a first end of the span of the bridge, the guide portion of the first handle configured to align the bridge with the main body portion of the first handle, and in which the resilient clip is within the guide portion of the first handle.

5. The game controller of claim 1, the first latch mechanism being further configured to require a first disengagement force in the retraction direction to unlock the bridge from the extended configuration, the first disengagement force being greater than a first retraction force exerted on the first latch mechanism in the retraction direction by the first spring mechanism.

6. The game controller of claim 1, further comprising:
    a first linear rack coupled to the first handle and in sliding engagement with the bridge, the first linear rack extending substantially along the span of the bridge; and
    a pinion affixed to the bridge and in contact with the first linear rack, the pinion configured to rotate relative to the bridge as the first linear rack is translated relative to the pinion.

7. The game controller of claim 1, in which the first spring mechanism comprises a first constant-load spring connecting the first handle to the bridge, the first constant-load spring configured to exert a substantially constant force in the retraction direction.

8. The game controller of claim 1, further comprising:
    a second handle configured to contact and support the mobile device, the second handle comprising a user-accessible, second hardware interface on a main body portion of the second handle and configured to accept touch inputs, the bridge being in sliding engagement with the second handle, the transverse midline of the bridge being between the first handle and the second handle, the bridge and the second handle being configured for the main body portion of the second handle to translate along the bridge in the retraction direction toward the transverse midline of the bridge and into the retracted configuration and also to translate in the extension direction away from the transverse midline of the bridge and into the extended configuration;
    a second spring mechanism configured to bias the second handle toward the retracted configuration; and
    a second latch mechanism configured to temporarily lock the bridge in the extended configuration.

9. A game controller for a mobile device, the game controller comprising:
    a first handle configured to contact and support a mobile device, the first handle comprising a user-accessible, first hardware interface on a main body portion of the first handle and configured to accept touch inputs;
    a bridge in sliding engagement with the first handle, the bridge having a span extending away from the main body portion of the first handle, the span having a transverse midline, the bridge and the first handle being configured for the main body portion of the first handle to translate in a retraction direction toward the transverse midline of the bridge and into a retracted configuration and also to translate in an extension direction away from the transverse midline of the bridge into an extended configuration, in which a guide portion of the first handle extends from the main body portion of the first handle and along a first end of the span of the bridge, the guide portion of the first handle configured to align the bridge with the main body portion of the first handle;
    a first spring mechanism configured to bias the first handle toward the retracted configuration; and
    a first latch mechanism configured to temporarily lock the bridge in the extended configuration, the first latch mechanism being further configured to require a first disengagement force in the retraction direction to unlock the bridge from the extended configuration, the first disengagement force being greater than a first retraction force exerted on the first latch mechanism in the retraction direction by the first spring mechanism.

10. A game controller for a mobile device, the game controller comprising:
    a first handle configured to contact and support a mobile device, the first handle comprising a user-accessible, first hardware interface on a main body portion of the first handle and configured to accept touch inputs;
    a bridge in sliding engagement with the first handle, the bridge having a span extending away from the main body portion of the first handle, the span having a transverse midline, the bridge and the first handle being configured for the main body portion of the first handle to translate in a retraction direction toward the transverse midline of the bridge and into a retracted configuration and also to translate in an extension direction away from the transverse midline of the bridge into an extended configuration, in which a guide portion of the first handle extends from the main body portion of the first handle and along a first end of the span of the bridge, the guide portion of the first handle configured to align the bridge with the main body portion of the first handle;
a first spring mechanism configured to bias the first handle toward the retracted configuration; and
a first latch mechanism configured to temporarily lock the bridge in the extended configuration;
a first linear rack coupled to the first handle and in sliding engagement with the bridge, the first linear rack extending substantially along the span of the bridge; and
a pinion affixed to the bridge and in contact with the first linear rack, the pinion configured to rotate relative to the bridge as the first linear rack is translated relative to the pinion.

11. The game controller of claim 10, in which the first latch mechanism comprises a catch coupled to the bridge and configured to contact and engage a step on the first linear rack in the extended configuration and disengage the step on the first linear rack in the retracted configuration.

12. The game controller of claim 11, in which the catch is pivotally coupled to the bridge, the first latch mechanism further comprising a cantilevered spring configured to apply a torque to the catch to bias the catch against the first linear rack.

13. The game controller of claim 12, in which the cantilevered spring is integral to and extends from the catch.

14. The game controller of claim 11, in which the catch comprises a tension spring having an engagement portion, the tension spring configured to bias the engagement portion against the first linear rack, the engagement portion configured to engage the step in the extended configuration.

15. A game controller for a mobile device, the game controller comprising:
a first handle configured to contact and support a mobile device, the first handle comprising a user-accessible, first hardware interface on a main body portion of the first handle and configured to accept touch inputs;
a bridge in sliding engagement with the first handle, the bridge having a span extending away from the main body portion of the first handle, the span having a transverse midline, the bridge and the first handle being configured for the main body portion of the first handle to translate in a retraction direction toward the transverse midline of the bridge and into a retracted configuration and also to translate in an extension direction away from the transverse midline of the bridge into an extended configuration, in which a guide portion of the first handle extends from the main body portion of the first handle and along a first end of the span of the bridge, the guide portion of the first handle configured to align the bridge with the main body portion of the first handle;
a first spring mechanism configured to bias the first handle toward the retracted configuration, the first spring mechanism comprising a first constant-load spring connecting the first handle to the bridge, the first constant-load spring configured to exert a substantially constant force in the retraction direction; and
a first latch mechanism configured to temporarily lock the bridge in the extended configuration.

16. A game controller for a mobile device, the game controller comprising:
a first handle configured to contact and support a mobile device, the first handle comprising a user-accessible, first hardware interface on a main body portion of the first handle and configured to accept touch inputs;
a bridge in sliding engagement with the first handle, the bridge having a span extending away from the main body portion of the first handle, the span having a transverse midline, the bridge and the first handle being configured for the main body portion of the first handle to translate in a retraction direction toward the transverse midline of the bridge and into a retracted configuration and also to translate in an extension direction away from the transverse midline of the bridge into an extended configuration, in which a guide portion of the first handle extends from the main body portion of the first handle and along a first end of the span of the bridge, the guide portion of the first handle configured to align the bridge with the main body portion of the first handle;
a first spring mechanism configured to bias the first handle toward the retracted configuration;
a second handle configured to contact and support the mobile device, the second handle comprising a user-accessible, second hardware interface on a main body portion of the second handle and configured to accept touch inputs, the bridge being in sliding engagement with the second handle, the transverse midline of the bridge being between the first handle and the second handle, the bridge and the second handle being configured for the main body portion of the second handle to translate along the bridge in the retraction direction toward the transverse midline of the bridge and into the retracted configuration and also to translate in the extension direction away from the transverse midline of the bridge and into the extended configuration;
a second spring mechanism configured to bias the second handle toward the retracted configuration; and
a second latch mechanism configured to temporarily lock the bridge in the extended configuration.

17. The game controller of claim 16, the second latch mechanism being further configured to require a second disengagement force in the retraction direction to unlock the bridge from the extended configuration, the second disengagement force being greater than a second retraction force exerted on the second latch mechanism in the retraction direction by the second spring mechanism.

18. The game controller of claim 16, further comprising a second linear rack coupled to the second handle and in sliding engagement with the bridge, the second linear rack extending substantially along the span of the bridge, the pinion being in contact with the second linear rack, the pinion further configured to rotate relative to the bridge as the second linear rack is translated relative to the pinion.

19. The game controller of claim 16, in which the second spring mechanism comprises a second constant-load spring connecting the second handle to the bridge, the second constant-load spring configured to exert a substantially constant force in the retraction direction.

20. The game controller of claim 16, in which a guide portion of the second handle extends from the main body portion of the second handle and along a second end of the span of the bridge, the guide portion of the second handle configured to align the bridge with the main body portion of the second handle.

21. A game controller for a mobile device, the game controller comprising:
  a first handle configured to contact and support a mobile device, the first handle comprising a user-accessible, first hardware interface on a main body portion of the first handle and configured to accept touch inputs;
  a second handle configured to contact and support the mobile device, the second handle comprising a user-accessible, second hardware interface on a main body portion of the second handle and configured to accept touch inputs;
  a bridge coupling the first handle to the second handle, the first handle further comprising a guide portion extending from the main body portion of the first handle and along a first end of the bridge, the guide portion of the first handle configured to align the bridge with the main body portion of the first handle, the bridge being in sliding engagement with the guide portion of the first handle and the second handle.

22. The game controller of claim 21, in which a guide portion of the second handle extends from the main body portion of the second handle and along a second end of the bridge, the guide portion of the second handle configured to align the bridge with the main body portion of the second handle.

23. The game controller of claim 21, in which the bridge has a span extending away from the first handle, the span having a transverse midline between the first handle and the second handle, the bridge and the first handle being configured for the first handle to translate in a retraction direction toward the transverse midline of the bridge and into a retracted configuration and also to translate in an extension direction away from the transverse midline of the bridge into an extended configuration, the bridge and the second handle being configured for the second handle to translate along the bridge in the retraction direction toward the transverse midline of the bridge and into the retracted configuration and also to translate in the extension direction away from the transverse midline of the bridge and into the extended configuration, the bridge being further configured such that the first handle and the second handle are equidistant from the transverse midline of the bridge when the first handle and the second handle are translating from the retracted configuration to the extended configuration.

24. The game controller of claim 23, in which the bridge is further configured such that the first handle and the second handle are equidistant from the transverse midline of the bridge when the first handle and the second handle are translating from the extended configuration to the retracted configuration.

* * * * *